United States Patent [19]

Boilen

[11] Patent Number: 4,750,135
[45] Date of Patent: Jun. 7, 1988

[54] METHOD FOR DYNAMICALLY CREATING A RECEIVER DEFINABLE LOCAL TRADING INSTRUMENT DISPLAYABLE RECORD FROM A REMOTELY TRANSMITTED TRADING INSTRUMENT COMMON DATA STREAM

[75] Inventor: Shelly Boilen, Westbury, N.Y.
[73] Assignee: Reuters Limited, London, England
[21] Appl. No.: 858,057
[22] Filed: May 1, 1986
[51] Int. Cl.⁴ .......................... G06F 3/14; G09G 3/02
[52] U.S. Cl. ................................... 364/514; 364/518; 340/719; 340/802
[58] Field of Search ............... 364/401, 406, 514, 517, 364/518; 340/721, 735, 718, 719, 723, 789, 798–803

[56] References Cited

U.S. PATENT DOCUMENTS 4,580,242 4/1986 Suzuki et al. ...................... 364/518

Primary Examiner—Parshotam S. Lall
Assistant Examiner—Brian M. Mattson
Attorney, Agent, or Firm—Stiefel, Gross & Kurland

[57] ABSTRACT

In accordance with the method of the present invention, a local subscriber defines its own filter sets and/or local templates which are used to create new updateable local trading instrument displayable data records from a common remotely transmitted data stream of trading instrument data records, which are user created reconstituted data records different from the transmitted trading instrument data records. A common one of the defined filter sets and/or local templates may be used for a plurality of different data records having a common desired set of information categories. The transmitted data may be in a logical data format or a page display format, in which instance it is converted to a logical data format. The local template is used to convert page display data to logical data and may be repetitively used on different display rows of a given page display and/or on different page displays to provide a plurality of receiver defined locally created trading instrument display records so that only the information desired by the local subscriber is displayed on his screen as user defined local trading instruments.

37 Claims, 3 Drawing Sheets

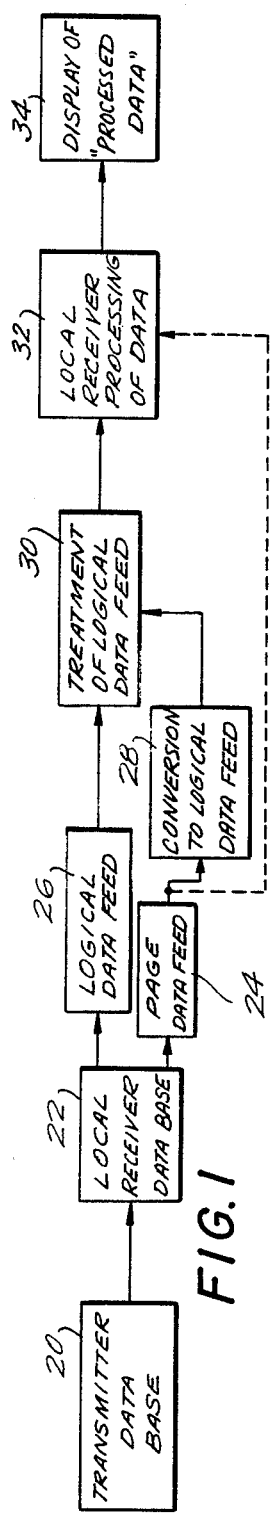
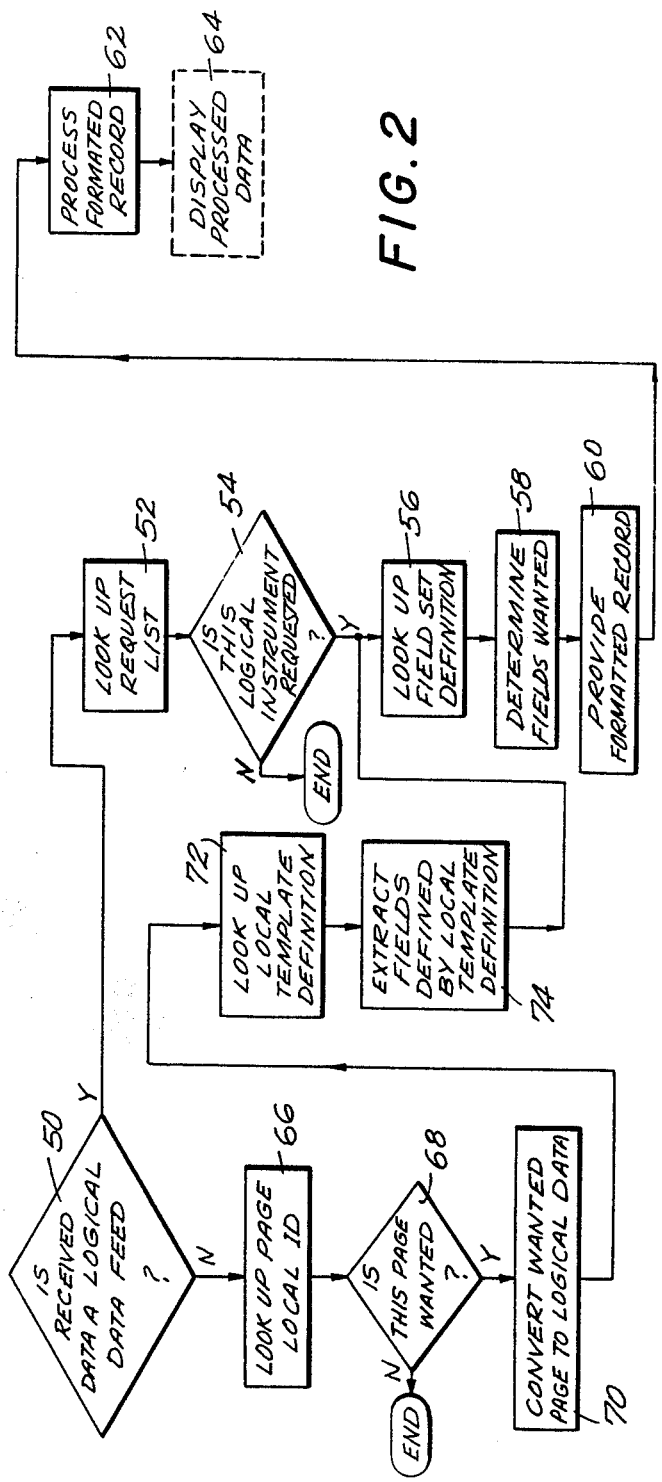

```
GOLD
MONTH   PRICE   PREV.   HIGH   LOW   CLOSE
 JAN      52     51      54     50    52
 FEB      58     53      58     53    55
 MAR      61     56      64     56    61
 APR      59     58      60     57    59
 MAY      59     58      59     54    58
 JUN      60     57      60     51    59
 JUL      62     60      64     58    62
 AUG      64     66      66     63    63
 SEP      62     66      70     60    62
 OCT      60     64      64     60    60
 NOV      59     62      62     59    59
 DEC      60     64      64     60    60
```
*FIG. 3*
*FIG. 4*
JG1 = JAN. GOLD, HIGH, LOW, CLOSE
*FIG. 5*
USER TEMPLATE = MONTH, HIGH, LOW, CLOSE
*FIG. 6*
*FIG. 7*
APG1 = APR. GOLD, HIGH, LOW, CLOSE
*FIG. 8*
(IS)(TYPE)(IS)(NAME)(IS)(FID)(IS)(DATA) --- ETC (IS)
*FIG. 10*
(FS)(316)(GS)(IBM)(RS)(5)(US)(129)(FS)
UPDATE TO THE PRICE DATA
*FIG. 11*

METHOD FOR DYNAMICALLY CREATING A RECEIVER DEFINABLE LOCAL TRADING INSTRUMENT DISPLAYABLE RECORD FROM A REMOTELY TRANSMITTED TRADING INSTRUMENT COMMON DATA STREAM

CROSS REFERENCE TO RELATED APPLICATION

This application is related to the commonly owned copending U.S. patent application entitled METHOD AND SYSTEM FOR DYNAMICALLY CONTROLLING THE CONTENT OF A LOCAL RECEIVER DATA BASE FROM A TRANSMITTED DATA BASE IN AN INFORMATION RETRIEVAL COMMUNICATION NETWORK, naming Richard A. Willis, Alan Markham and Robert S. Genshaft as joint inventors thereof, bearing U.S. Ser. No. 813,703, filed Dec. 27, 1985, the contents of which is specifically incorporated by reference herein in their entirety.

Technical Field

The present invention relates to methods for dynamically creating a receiver definable local trading instrument displayable record from a remotely transmitted trading instrument common data stream, such as a transmitted trading instrument common data stream comprising a plurality of transmitted trading instrument data records which may be transmitted in a logical data format and/or in a page display format comprising a plurality of displayed rows for each page in which instance the page display format is initially converted to a logical data format before creating the receiver defined local trading instrument displayable record, which local trading instrument displayable record is a new local trading instrument displayable record which is a reconstituted data record different from the transmitted trading instrument data record.

BACKGROUND ART

High performance, real-time information retrieval networks are well known in the art, such as the REUTERS MONITOR system employed for transmitting financial transaction information such as stock market information and other trading instrument information to brokers, banks and other subscribers. Such information is normally transmitted in a trading instrument common data stream, such as the data stream commercially available under the designation "REUTERS MARKETSTREAM" described by way of example in the aforementioned commonly owned copending U.S. patent application No. 813,703, which is incorporated by reference herein in its entirety. Such a trading instrument common data stream normally contains a large of number of information categories which professional traders and financial planners use in order to evaluate what action to take in connection with a given financial transaction. However, different professional traders and different financial planners require only certain aspects of the vast number of information categories normally transmitted. Thus, for example, a given professional trader or financial planner might only be interested in the month, high, low and closing price for gold and not be interested in the various other categories associated with the transmission of a trading instrument relative to gold, or he might be interested only in price and volume if he were doing charting or only in closing price if he were doing portfolio evaluation. In such an instance, in conventional prior art systems and methods, the professional trader or financial planner receiving the common data stream must display all of the information relative to the trading instrument in the above example including considerable information which is extraneous to his purpose. This is undesirable, particularly in todays's environment involving the transmission of high volumes of financial instruments which normally undergo a high frequency of changes in price and other characteristics or information catagories including those that are of interest to only certain financial planners or professional traders. Just as was described in the aforementioned copending U.S. patent application with respect to the problems which were overcome by allowing the local user to create its own unique local data base from the pool of available transmitted information, since a local user or subscriber, such as a bank, may not be interested in the entire data base supplied by an information supplier such as Reuters which supplies worldwide information relating to a vast number of financial instruments, the local subscriber may not be interested in displaying all of the information categories relating to the trading instruments which make up its unique local subscriber data base.

In an effort to overcome some of these problems, Reuters developed a Monitor Manipulation Processor for extracting entire pages of data from its REUTERS MONITOR data stream; however, such a system does not readily allow for the creation at the receiver of unique new local trading instrument displayable records which are reconstituted data records different from the transmitted trading instrument data records and tailored to contain and display only the information categories desired by the local subscriber. Moreover, in accordance with the present invention, these new locally identifiable trading instrument displayable data records which are created at the receiving end from the common remotely transmitted trading instrument data stream in accordance with the displayable information needs of the user or local subscriber are dynamically updateable as if they were an originally transmitted data record thereby enabling the local subscriber to create and display his own locally defined trading instruments which are unique subsets of the transmitted trading instruments. This may be accomplished with received transmitted trading instrument data records in a logical data format and/or page display format in which instance they are initially converted to a logical data format through the use of locally created templates and filter sets.

Moreover, although templates per se have been used at a local receiver to match information by a comparison technique, such as disclosed in U.S. Pat. Nos. 4,530,095; 4,507,750; 4,504,735; 4,499,499; 4,488,005; 4,468,204; 4,463,386; 4,388,495; 4,383,135; and 4,336,810, none of these prior art systems known to applicant employs a locally created template to create a new locally identifiable trading instrument displayable data record from a page display format transmitted trading instrument displayable data record nor do they disclose the use of filter sets to create such locally identifiable trading instrument displayable data records comprising reconstituted data records which are different from the transmitted trading instrument data record, nor such newly created records which can be dynamically updated. Thus, the presently preferred method and system of the present invention enables unique user defined locally identifiable trading instrument displayable data records to be created at the receiving end from a common remotely transmitted trading instrument data stream dependent on the displayable information needs of the user or local subscriber. Accordingly, the disadvantages of the prior art are overcome by the system and method of the present invention.

DISCLOSURE OF THE INVENTION

The present invention relates to a method and system for dynamically creating a receiver definable local trading instrument displayable data record from a remotely transmitted trading instrument common data stream whereby unique user defined locally identifiable trading instrument displayable data records may be created at the receiving end from the common remotely transmitted trading instrument data stream dependent on the displayable information needs of the user or local subscriber. The transmitted trading instrument common data stream may be in the form of logical data records and/or in a page display format comprising a plurality of display rows, in which instance, the page display format is converted to a logical data format prior to the creation of the receiver definable local trading instrument displayable data records. In either instance, the transmitted trading instrument common data stream which is provided from a remote source comprises a plurality of transmitted trading instrument data records. When the transmitted data records are in a logical data format, each of the trading instrument data records comprises a plurality of different displayable information record fields with each of the displayable information record fields for a particular trading instrument data record comprising an information category for the particular trading instrument.

When the transmitted trading instrument data record is in a page display format, a local receiver template is defined at the receiving end in order to convert the page display format to a logical data format. In defining the local receiver template, data locations in a portion of the page display format are defined for defining relative positions of logical fields in the page display format for a given display row in the page display format for providing a local template defined set of displayable information record fields. Each of the defined data locations comprises a defined area of the page display format display row. Each of the defined areas comprises an individual displayable information record field in the received transmitted displayable page data record with the displayable page data record comprising a plurality of bytes. In such an instance, each field is defined by an offset from the beginning of the associated area and the number of bytes comprising the field.

In either instance, a desired filter set of displayable information record fields is defined at the receiving end with the defined desired filter set comprising a plurality of record field identifiers. Each of the record field identifiers is uniquely associated with a different one of the displayable information record fields, with the defined filter set comprising a receiver defined portion of the plurality of available displayable information record fields. In the instance when a local receiver template is employed for data in a page display format, the desired filter set is defined in the local receiver template and is extracted from the local receiver template with the extracted filter set comprising a plurality of record field identifiers.

When the transmitted trading instrument data record is in the form of logical data, it is tagged in the received transmitted trading instrument common data stream with the desired receiver defined filter set for defining a new receiver defined local trading instrument displayable data record for each of the tagged transmitted trading instruments with the new local trading instrument displayable data record comprising only the portion of the information categories corresponding to the receiver defined portion of displayable information record fields. Thus, a new user defined local trading instrument is created which provides a display of only the information desired by the local subscriber. Moreover, this new user defined local trading instrument may be dynamically updated as the particular categories defined in this new local trading instrument are dynamically updated in the transmitted common data stream so that from the local subscriber's point of view it appears as if he is dynamically receiving his uniquely tailored local trading instruments such as stocks, bonds or other financial instruments. When the particular transmitted trading instrument data record is in a page display format, this record is tagged in the common data stream with the associated local receiver template for defining a new receiver defined local trading instrument displayable data record for each of the tagged transmitted trading instrument displayable page data records, with the extracted filter set displayable information record fields defining the new receiver defined local trading instrument displayable data record which comprises a reconstituted data record different from the transmitted trading instrument displayable page data record. This is also true for data in the logical data format wherein the extracted filter set displayable information fields comprise a reconstituted data record for each of the created new local trading instrument displayable data records which reconstituted data record is different from the transmitted trading instrument data record.

In accordance with the presently preferred method of the present invention, the filter set and/or the template may be varied or a common filter set and/or template may be used for a plurality of different transmitted trading instrument data records so as to provide a plurality of receiver defined new local instrument trading instrument displayable data records having a common set of information categories, such as for all NYSE stocks or for the stocks in the Dow Jones Average. Moreover, in the instance of data transmitted in a page display format, the user created local template may be repetitively used on different rows of a given page display and/or on different page displays to provide a plurality of receiver defined new local trading instrument displayable data records.

By employing the method and system of the present invention an efficient system for dynamically creating receiver definable or locally identifiable dynamically updateable local trading instrument displayable data records at the receiver end or local subscriber so that only the information desired by the local subscriber is displayed on his screen as user defined local trading instruments is achieved.

BRIEF DESCRIPTION OF THE DRAWINGS

FIG. 1 is a diagrammatic logic flow diagram illustrating the presently preferred method of the present invention for dynamically creating locally identifiable receiver defined dynamically updateable local trading instrument displayable data records at the receiver end from a remotely transmitted common trading instrument data stream;

FIG. 2 is a diagrammatic logic flow diagram of the presently preferred method of the present invention illustrated in FIG. 1, illustrating the presently preferred method for treating the logical data and/or page data feed illustrated in FIG. 1;

FIGS. 3–8 are diagrammatic illustrations relating to the creation of local templates for the treatment of data transmitted in a page display format in accordance with the presently preferred method of the present invention illustrated in FIG. 1;

FIG. 10 is a diagrammatic illustration of a typical data record in accordance with the presently preferred method of the present invention; and FIG. 11 is a diagrammatic illustration, similar to FIG. 10, of a typical update data record for price in accordance with the presently preferred method of the present invention.

BEST MODE FOR CARRYING OUT THE INVENTION

Figure 9:
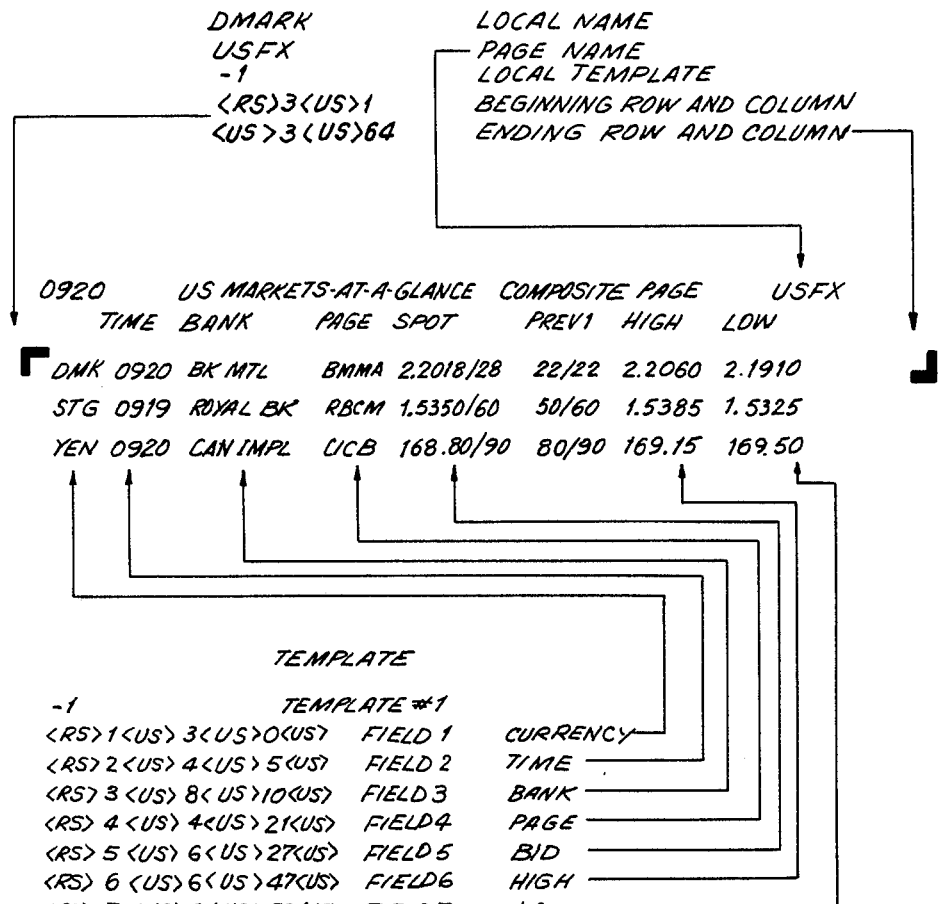
FIG. 9 is a diagrammatic illustration of the presently preferred method of creating fields in converting page data to logical data in accordance with the presently preferred method of the present invention illustrated in FIG. 1.

For purposes of illustration, the presently preferred method of the present invention shall be described in terms of an information retrieval system for trading instrument data, such as stock market data and money market information and particularly in terms of use with a high speed remotely transmitted data feed or common data stream of such trading instrument data records such as the data stream which is described in the aforementioned commonly owned U.S. patent application Ser. No. 813,703, commercially available under the designation "REUTERS MARKETSTREAM" and specifically incorporated by reference herein in its entirety, and which is a protocol used for long distance transmission of logical data which is ISO compatible. As shown and preferred in FIG. 1, and as will be described in greater detail hereinafter, the presently preferred method of the present invention is also usable with trading instrument data records which are transmitted in a page display format as opposed to a logical data feed, such as illustrated in FIG. 3, wherein the page display data is preferably converted to logical data in accordance with the presently preferred method of the present invention prior to treating the data to provide a locally identifiable or receiver defined local trading instrument displayable data record in accordance with the presently preferred method of the present invention.

For purposes of the following description of the presently preferred method of the present invention, it is assumed that the system employed transmits and receives standard 8 bit ASC11 characters and that there is a perfect transmission link in keeping with an ISO OSI model.

Referring initially to FIG. 1, the general approach to the presently preferred method of the present invention is shown. A common remotely transmitted trading instrument data stream, such as the data stream described in the U.S. patent application Ser. No. 813,703, is transmitted from the remotely located transmitter data base 20 to the various local receiver data bases located at a plurality of local subscribers, with only one such typical subscriber data base 22 being illustrated in FIG. 1. At the local receiver data base 22, the local subscriber may create its own local data base as a subset from the overall transmitted data base 20, such as in accordance with the method described in the aforementioned U.S. patent application Ser. No. 813,703 incorporated by reference herein. The transmitted common data stream may contain trading instrument displayable data records which are in a page display format as represented by reference numeral 24, such as illustrated in FIG. 3, and/or in the presently preferred logical data format, represented by reference numeral 26, which is the format of the REUTER MARKETSTREAM data feed, such as described in the aforementioned U.S. patent application Ser. No. 813,703. These transmitted trading instrument data records are preferably identified by unique codes or RICs. As shown and preferred in FIG. 1, and as previously referred to, trading instrument displayable data records which are desired or requested by the local subscriber and which are transmitted and received in a page display format are first preferably converted to a logical data feed format such as employed for the REUTER MARKETSTREAM data feed, as represented by reference numeral 28, and then treated as a logical data feed in the same manner as the transmitted and received logical data feed data, as represented by reference numeral 30. Thereafter, the local receiver processes the receiver defined locally identifiable trading instrument displayable data records, as represented by reference numeral 32, to provide a tailored display of these unique user defined or local trading instruments, as represented by reference numeral 34.

Trading instrument data records, such as illustrated in FIG. 10, normally contain a plurality of fields or information categories relating to the particular trading instrument which fields in a logical data record such as REUTER MARKETSTREAM are each identified by a unique field identifier or FID which is preferably a numeric identifier. By way of example, the below table illustrates a typical group of fields and corresponding unique numeric field identifiers which could be employed with a logical data feed common data stream to be treated in accordance with the presently preferred method of the present invention to provide uniquely tailored locally identifiable receiver defined updateable trading instrument displayable data records employing one or more of these fields for any given trading instrument or RIC dependent on the needs and desires of the local subscriber, with the local subscriber using a filter set, which is a subset of fields, to define those particular fields which are relevant to his interest, in accordance with the presently preferred method of the present invention. These filter sets are, in turn, preferably uniquely defined by filter set identifiers which are unique numeric identifiers of the filter sets.

| TYPICAL FIELD LIST | |
|---|---|
| FID | Field Name |
| 3 | Display_Name |
| 4 | Exchange_ID |
| 5 | Trade_Price_1 |
| 6 | Trade_Price_2 |
| 7 | Trade_Price_3 |
| 8 | Trade_Price_4 |
| 9 | Trade_Price_5 |
| 10 | Net_Change |
| 11 | High |
| 12 | Low |
| 13 | Price_Tick |

TYPICAL FIELD LIST -continued

14 Currency_Code
15 Last_Activity_Type
16 Trade_Date
17 Date_of_Activity
18 Trade_Time
19 Time_of_Activity
20 Open
21 Close
22 Previous_Close
23 Historic_Close
24 Bid_Price
25 Ask_Price
26 Bid_size
27 Ask_Size
28 Bid_Ask_Condition_Code
29 Accumulated_Volume
30 Dividend
31 Earnings
32 Yield
33 Price_Earnings_Ratio
35 Dividend_Payment_Date
36 Ex_Dividend_Date
40 Block_Count
41 Block_Volume
42 Trade_Exch_ID
43 Bid_Exch_ID
44 Ask_Exch_ID
45 Open_1
46 Open_2
47 Open_Type
48 Close_1
49 Close_2
50 Close_Type
51 Previous_Close_1
52 Previous_Close_2
53 Previous_Close_Type
54 Historic_Close_1
55 Historic_Close_2
56 Historic_Close_Type
57 Dow_Jones_News_Time
60 Market_Condition_Code
61 Life_Of_Contract_High
62 Life_Of_Contract_Low
63 Open_Interest
64 Open_Int_Net_Change
65 Strike_Price
66 Expiration_Date
67 Maturity_Date
68 Coupon_Rate
69 Settlement_Price
70 Previous_Settlement_Price
71 Settlement_Net_Change
72 Nominal_Price
73 Ring_Price
74 Upper_Trading_Limit
75 Lower_Trading_Limit
76 Number_of_Moves
77 High_Type
78 Low_Type
79 Close_Bid
80 Close_Ask
81 Official_Exchange_Number
82 Ex_Markers
83 Kassakurse_Price
84 Kassakurse_Qualifier
85 Issue_Time
86 Parity_Price
87 Forward_Price
88 Geloster_Price_Indicator
89 First_Period_Price
90 Second_Period_Price
91 Capitalisation
92 Buying_Contracts
93 Selling_Contracts
94 Euroclear_Number
95 Number_of_Buyers
96 Number_of_Sellers
97 AM_Close
98 PM_Close
99 Open_Interest_1_Day_Previous
100 Open_Interest_2_Day_Previous

TYPICAL FIELD LIST -continued

101 Open_Range_1st_Extreme
102 Open_Range_2nd_Extreme
103 Kerb_Trade
104 Kerb_Bid
105 Kerb_Ask
106 Kerb_Volume
107 Redemption_Price
108 Issue_Price
109 Accrued_Interest
110 Fiscal_Credit
111 Gross_Dividend
112 Net_Dividend
113 Echeance_Month
114 Echeance_Number
115 Echeance_Price_1
116 Echeance_Price_2
117 Echeance_Price_3
118 Echeance_High_1
119 Echeance_High_2
120 Echeance_High_3
121 Echeance_Low_1
122 Echeance_Low_2
123 Echeance_Low_3
124 Currency_Fixing_Intbnk_Price
125 Currency_Fixing_Bid_Price
126 Currency_Fixing_Ask_Price
127 Report_Deport
128 Premium It should be noted that the above exemplary fields are preferably variable length with a typical data record being illustrated in FIG. 10, using ASCII data separators, with the symbol "IS" representing an information separator. The ASCII information separators, such as file separator (FS), group separator (GS), record separator (RS) and unit separator (US), are used in a hierarchial manner, i.e. when they are used as parentheses the lower level separator has the effect of closing the parentheses for that level and all higher ones, as illustrated in FIG. 11. For example, in REUTER MARKETSTREAM there in a hierarchy of fields and groups of fields which is supported by the presently preferred method of the present invention; e.g., the fields of an update FID and Data, are separated from each other by the ASCII separator <US>, and the pair FID <US> <DATA>, are separated from additional pairs by the ASCII separator <RS> in the conventional BNF type of notation employed hereinafter in describing the presently preferred method of the present invention. In employing this exemplary BNF notation herein, the following definitions are employed: <. .. > is used to enclose a named thing; <Alpha name> represents any RIC; <Application specific field> indicates a field of characters sent, unique to an implementation; <Filter set> represents a subset of fields relevant to a host which is a computer, such as an IBM PC operating in accordance with the presently preferred method of the present invention, for receiving the processed logical data feed or contributed data provided as opposed to a TC or terminal controller which transmits the processed logical data feed or receiver contributed data; <Filter Set ID> represents the numeric identifier of a filter set; <Field ID> represents a numeric identifier of a data feed field such as illustrated above in the typical field list; <Local field ID> is the same as a field ID but defined by the host; <Field Data> represents the ASCII equivalent of an update and allows for partial field data; <Source Logical address> represents the logical address, such as 24 bits expressed as six hexidecimal characters; CIP represents the contributor interface processor; <RTL> represents the transaction level which is incremented each time an update or correction is received for a record; <DATA Partition> which represent the field which denotes the database partition which has this RIC, <RIC> which represents the unique code for a transmitted record; <Template number> which represents the number indicating the template associated with a record which template, in accordance with the presently preferred method of the present invention, enumerates the fields of a record and associates the field IDs with that template and is used in connection with a page display data feed; <Parse Method> which is the method used to extract logical data from page data; <Presentation Method> which is the method used to convey a logical field derived by parsing. The ASCII or ISO separators FS, GS, RS, US, referred to above, are enclosed in < > as well.

In addition to the above notation, the following notation is also employed herein: 1{...}m indicates that the enclosed structure may occur 1 to m times; ( ) encloses optional structures; COMMAND represents a host-to-TC communication; TRANSMISSION represents a TC-to-host communication; MESSAGE represents either a command or transmission; Filter set 0 by convention means all fields; Port represents the circuit (physical/virtual). With respect to the presentation syntax employed, objects are named and used in < > while literals are not contained in < >; items that can occur a variable number of times are presented as m{...}n indicating that the named structure can occur from m to n times; and optional fields are enclosed by ( ). With respect to the control codes employed, CSI is the ISO control sequence introducer; REP is an ISO control sequence represented by CSI n b and indicates that the prior graphic character is to be repeated n times; CUF is the ISO editor function Cursor Forward represented by CSI n C, where n is the number of character positions forward the cursor is moved; CAN is an ISO control used to indicate that the data since the prior <FS> is in error and should be discarded; and EM which is the ISO end of medium character received for use by the packet layer-presentation layer interface. It should be further noted that field contents are represented in a display compatible form with members preferably being represented by a sequence of ASCII characters and with any offset into a field being indicated by the ISO editor function CUF cursor forward which is represented by CSI n C where n is the offset value.

Now that the basic notation to be used herein in descrbing the presently preferred method of the present invention has been defined, the various steps employed herein will be described in greater detail hereinafter using thus notation. However, before doing this, the method of the present invention shall generally be described with reference to FIG. 2. The host computer at the local subscriber which processes the incoming common data stream and creates the locally defined local trading instrument displayable date records dependent on the user's needs, may preferably be any conventional microcomputer capable of sending and receiving standard 8 bit ASCII characters, such as and IBM PC or IBM compatible computer, by way of example, capable of operating, by way of example, under a PL/M-86 compiler for C code, such as available from Lattice Inc. The host computer preferably determines whether the remotely transmitted common trading instrument data stream data record being received is a logical data feed such as the data feed described in the aforementioned U.S. patent application Ser. No. 813,703, or a page display data format, as represented by reference numeral 50 in FIG. 2. If the received record is a logical data feed, then the request list is examined by the host computer to determine if this logical instrument record has been requested, as represented by reference numerals 52 and 54 in FIG. 2. Prior to this, it is assumed that the local subscriber has created and indicated to the host computer a definition of the relevant filter set to be employed for a particular trading instrument or instruments of interest and has related each selected trading instrument to a user defined filter set. In addition, the user will have indicated whether a snapshot or one time request is desired or whether an updateable request is desired. Thereafter, if the host computer determines that the received logical trading instrument is one which has been requested by the user or local subscriber, it looks up the relevant field set definition which has been tagged to that record or RIC and determines the particular fields selected by the local subscriber, as represented by reference numerals 56 and 58 in FIG. 2. This information is then used to reformat the received tagged transmitted trading instrument data record into a new receiver defined local trading instrument displayable data record which is a reconstituted data record which comprises only the portion of the fields or information categories corresponding to the user defined filter set as opposed to all of the various fields contained in the remotely transmitted trading instrument data record as represented by reference numeral 60 in FIG. 2, with the reconstituted data record being illustrated in FIG. 10. This reconstituted data record or locally identifiable trading instrument is then processed and displayed at the local subscriber terminal by the terminal controller or TC, as represented by reference numeral 62 and 64 in FIG. 2, which display contains only the selected information categories desired by the local subscriber. Moreover, this new local trading instrument may be dynamically updated in real time as the received transmitted trading instrument data record is updated in the common data stream so that to the user it is as if his unique user defined local trading instrument had been transmitted as such from the source of the common data stream. A typical update data message for price in accordance with the presently preferred method of the present invention is shown in FIG. 11 which employs the aforementioned hierarchial ASCII information separators.

As was previously mentioned, the transmitted original data records received by the host computer may be in the form of page display data as opposed to a logical data feed, such as illustrated in FIGS. 3 and 9, in which instance the received record is preferably first converted to the same type of format as the logical data feed so as to preferably make the record independent of the display. Again referring to FIG. 2, if the received record is in a page display format, the local ID for the page is looked up by the host computer in order to determine if this page has been requested, as represented by reference numerals 66 and 68 in FIG. 2. The desired page display data is then preferably converted to logical data, as will be described in greater detail with reference to FIGS. 3-9, as represented by reference numeral 70 in FIG. 2. As will be described in greater detail hereinafter, the local subscriber preferably creates local template definitions in accordance with the presently preferred method of the present invention. The user created local template definition defines the fields to be used in extracting data in the manner of the aforementioned field sets, but which are preferably used in the page-to-logical data conversion process as shown in FIG. 9. The page display data record is tagged with the local template whose definition is then looked up by the host computer and the relevant fields defined by the local template are then extracted from the local template, as represented by reference numerals 72 and 74 in FIG. 2. Thereafter, since the page display data record has been converted to a logical data record, it is then preferably processed in the previously described manner used for a logical data feed.

As shown and preferred in FIGS. 3-9, in converting page data to logical data in accordance with the presently preferred method of the present invention, a local template is first defined by the user and an area of a page is named and associated with that local template. The local template preferably assumes a continuous string of bytes to be a record with areas of that record then being chosen to be individual fields as illustrated by way of example in FIG. 9 which shows seven fields comprising exemplary template #1, which fields are defined by areas of the record, which record is illustratively shown as comprising one display row on the page, such as for DMK in the example of FIG. 9. These areas chosen to be individual fields are preferably chosen by specifying the offset from the beginning of the area and the number of bytes that make up that field. Preferably, as shown by way of example in FIG. 9, the area is chosen by specifying an upper left corner and a lower right corner of a rectangle, with the area then being considered to be a continuous string with no breaks. Of course, the user could reasonably restrict the area to be the entire page by not allowing the start and end to be specified and, in the same way, fields could be restricted so that they do not cross display rows. FIG. 9 also illustrates a typical filter set definition which can be extracted from the local template defined therein as well as a typical snapshot request based thereon.

FIGS. 3-8 illustrate another example, in simpler form, for converting page data to logical data and ultimately to the user defined local trading instrument. Thus, FIG. 3 illustrates a typical page display for an exemplary trading instrument for gold by way of example. FIG. 4 illustrates the user defined local template for a single display row which covers the particular categories or fields of interest for that user defined by areas in the page display of FIG. 3 which template is logically overlayed on the page display to create the local template defined local trading instrument, which is given a new logical instrument name, such as represented by JG1 in FIG. 5, with the template being represented in FIG. 6. FIG. 7 illustrates the repetitive use of this same local template definition for a different display row in the page display format of FIG. 3 to create a different local trading instrument represented by APG1 in FIG. 8. Thus, in converting page data to logical data, the page must be defined, the local template defined, the "position" of the template in the page display defined and the new local trading instrument be given a local ID or logical instrument name, whereby it can then preferably be treated in the same manner as transmitted logical data.

It should be noted, however, that in accordance with the presently preferred method of the present invention, a single or common user created local template can be repetitively employed for different display rows of a given page display, as illustrated in FIGS. 3-8, and/or for different page displays. In this regard, it should be noted that preferably all database items are conceived as records and fields of those records, with each record having a unique record name. In the instances where templates are employed, record formats are preferably defined by their template which is a list of the fields within a record. Thus, records which have the same format have the same template. For example, as previously mentioned, all NYSE stocks could have the same template in accordance with the presently preferred method of the present invention. With respect to field ID's for a given page display, they may preferably be arbitrary, with lines or half lines usually comprising fields.

Various ISO type control commands are preferably employed with the host computer to enable the host computer to act as a keystation as well as a computer in accordance with the presently preferred method of the present invention. By way of example, and using the aforementioned BNF type notation, these exemplary ISO type control commands are as follows, assuming the protocol employed in accordance with the presently preferred method of the present invention is the aforementioned U.S. patent application Ser. No. 813,703.

The Set Marketfeed Mode command establishes Marketfeed as the protocol. The format is: <CSI>?100h, The Reset from Marketfeed Mode command returns the TC to normal mode. The format is: <CSI>?100m.

The Reset to Initial State may be used as a command or transmission and causes intialization. It is a complete reset. The format is: <ESC>c The Soft Reset clears the output queue and stops all update traffic. The format is: CSI ! p.

The Set Port On command which will enable the port. It is assumed that some other port will be disabled by this command. The format is: CSI? 103h.

The Reset Port Off command which will disable the port. The only command that will be seen by the port is Set Port On. If a TC can only support a limited number of ports it needs these commands. The format is: CSI? 103m.

As was previously mentioned, an important aspect of the presently preferred method of the present invention relates to the ability of the user or local subscriber to define filter sets, which may be added or deleted as desired by the user to provide the desired user defined locally identifiable trading instrument display records at the receiver. These filter set definitions, as previously described, are preferably used by the host computer to select a particular user defined collection of fields to be passed from a terminal controller or TC, with the filter sets controlling the data the host computer receives. For example, one filter set may be defined to contain price and volume by a host doing charting and another filter set may be defined to contain closing price only for a host computer that may be doing portfolio analysis. By way of example, it is assumed that filter set 0 is defined to mean all fields, exclusive of permissions if they are employed. The record of interest is preferably tagged by the host with the relevant filter set number in accordance with the presently preferred method of the present invention, thereby eliminating the need to tag individual fields within the record. In the maintenance of filter sets in accordance with the presently preferred method of the present invention, various commands are employed by way of example. These exemplary commands are as follows, using illustrative message numbers which correspond to these exemplary commands.

The Add Filter Set Definition (message #303) message defines a filter set. This definition associates a filter set number with a list of field IDs and provides a way for the host computer to define a collection of fields of interest.

The format is:

```
<FS>303
   <GS> <Filter_set_number>
   1{ <RS> <Field_ID> }m
<FS>
```

The drop Filter Set Definition (message #311) command deletes filter set definition. It is an error in accordance with the presently preferred method of the present invention to delete a filter set while data requests using that filter set are active.

The format is:

```
<FS>311
   <GS> <filter set_number>
<FS>
```

The Drop all Filter Set Definitions (messages #406) command deletes all filter set definitions. It is an error in accordance with the presently preferred method of the present invention to delete all filter sets while any request using a filter set is outstanding.

The format is:

```
<FS>406
<FS>
```

Apart from the above Filter Set maintenance message, two type of data requests are also preferably employed in accodance with the presently preferred method of the present invention. These are a request for data (snapshot) and a request for data to be followed by updates.

The Data and Update Request (message #332) command requests the present values of the data selected by the filter set and enables updates of those fields for the named instrument to follow.

The format is:

```
<FS>332(<US><Application_specific_field>)
   <GS><Alpha_name>(<US><Filter_set_ID>)
<FS>
```

Other examples of possible commands employed in accordance with the presently preferred method of the present invention are as follows. The Cache Request (message #336) command requests the controller to cache the data.

The format is:

```
<FS>336(<US><Application_specific_field>)
   <GS><Alpha_name>(<US><Filter_set_ID>)
<FS>
```

As was previously mentioned, the default filter set is 0, all fields.

The Cache Release (message #337) command requests the controller to unlock the data from cache.

The format is:

```
<FS>337(<US><Application_specific_field>)
   <GS><Alpha_name>
<FS>
```

The Cache Delete (message #387) command requests the controller to delete the data from cache.

The format is:

```
<FS>387(<US><Application_specific_field>)
   <GS><Alpha_name>
<FS>
```

The Halt Updates (message #348) command is used to halt updates on a given trading instrument or RIC.

The format is:

```
<FS>348(<US><Application_specific_field>)
   <GS><Alpha_name>
<FS>
```

The Host Identify (message #371) command allows a host to establish its logical address so the TC can get permissions.

The format is:

```
<FS>371(<US><Application_specific_field>)
   <GS><Logical_address>
<FS>
```

The Time Request (message #372) command requests the TC's time of day.

The format is:

```
<FS>372<US><Application_specific_field>
   (<GS><Request_type>)
<FS>
```

By way of example, if the Request type is 0 then time is to be sent once, if the request type is 1 the time is to be sent each time the TC receives it, and if the request type is 2 the time transmission should be stopped. The default request type is 0.

Now that some typical messages and commands have been discussed, some typical responses, such as data responses, sync responses, status responses, etc. will be discussed by way of example. The Data Response (message #340) transmission is preferably issued by the TC in response to a request. It is transmitted before any updates. Included updates should not be duplicated and no subsequent update should be lost. It can be used to determine the template of an instrument. The template may be required so the receiving program can allocate data storage for the instrument. The class of a local ID is 255.

The format is:

```
<FS>340(<US><Application_specific_field>)
```

```
<GS>><Alpha_name><US><Template_No>(<US><RTL><US><Data_Partition>)
   1{ <RS><Field_ID><US><Field_value> }n
<FS>
```

The Verify or sync (message #318) transmission is preferably issued by a DATAFEED ONLY. It reflects a copy of the central data base and is synchronous with the updates.

The format is:

```
<FS>318(<US><Application_specific_field>)
   <GS>><Alpha_name><US><Template_No>(<US><RTL><US><Data_Partition>)
   1{ <RS><Field_ID><US><Field_value> }n
<FS>
```

The Status Response (message #407) transmission is preferably used to communicate status to the host.

The format is:

```
<FS>407<US><Application_specific_field>
   <GS><Status>
   (<RS><variable>)
        <FS>
```

Status=1=Negative for technical reasons
Status=2=Negative—no such name, variable=name
Status=3=Not permissioned, variable=name Status=4=Looking, wait. (MS type system), variable=name
Status=5=Port not available
Status=6=No such filterset number, variable=filterset number
Status=7=Invalid Local Template Definition, variable=Local Template ID
Status=8=Invalid Local ID Definition, variable=Local RIC
Status=10=Too many names, variable=name
Status=11=Too many filter sets, variable=filterset ID Status=12=Too many Private templates, variable=-template no
Status=13=Too many Local IDs, Variable=Local ID
Status=20=Communication accepted (can be used if a positive acknowledge scheme is required)
Status=21=Queue overflow
STATUS=22=Invalid Host logical address, Variable=Logical address Another type of exemplary transmission used to communicate status to the host is the Asynchronous Status Response (message #408). It is useful for broadcast devices which may encounter error conditions some time after the request is made.

The format is:

```
<FS>408(<US><Application_specific_field>)
   <GS><Status>
   (<RS><variable>)
   <FS>
```

The field Update (message #316) transmssion is used to provide updates. The fields are preferably limited to those listed in the Filter Set Definition.

The format is:

```
<FS>316(<US><Application_specific_field>)
   <GS><Alpha_name>(<US><RTL><US><Data_Partition>)
   1{ <RS><Field_ID><US><Update_Data> }m
<FS>
```

Other exemplary responses are correction, database add, database drop and time response. These are as follows.

Correction (message #317) is transmitted as a consequence of the controller receiving a correction.

The format is:

```
<FS>316(<US><Application_specific_field>)
   <GS><Alpha_name>(<US><RTL><US><Data_Partition>)
   1{ <RS><Field_ID><US><Update_Data> }m
<FS>
```

Database Add (message #301) is transmitted as a consequence of the controller receiving a database add. This indicates that a new name has been added to the database.

The format is:

```
<FS>301(<US><Application_specific_field>)
   <GS>><Alpha_name><US><Template_No>(<US><RTL><US><Data_Partition>)
   1{ <RS><Field_ID><US><Field_value> }n
<FS>
```

Database Drop (message #308) is transmitted as a consequence of the controller receiving a correction. This indicates that a name has been dropped from the database.

The format is:

```
<FS>301(<US><Application_specific_field>)
```

```
    <GS><Alpha_name>
    <FS>
```

Time Response (message #367) is the time and date message.
The format is:

```
<FS>367(<US><Application_specific_field>)
   <GS><Julian_calendar_year>
   <US><Julian_calendar_month>
   <US><Julian_calendar_day>
   <US><Twenty_four hour_Hours>
   <US><Minutes>
   <US><Seconds>
<FS>
```

Some typical commands which may be employed by way of example, in accordance with the presently preferred method of the present invention in converting page to logical data are to add or drop a local ID definition, add or drop a local template definition, drop all local IDs or drop all local templates. These exemplary commands are defined as follows.

The Add Local ID Definition (message #400) command names an area of a page and relates a local template to that area. The local template will be used to find individual fields within that area.
The format is:

```
<FS>400(<US><Application_specific_field>)
   <GS><Local_RIC>
   <GS><Page_alpha_name>
   <RS><Local_template_ID>
      (<RS><Beginning_row><US><Beginning_column>
      <US><Ending_row><US><Ending_corner_column> )
<FS>
```

It should be noted that if the beginning and ending positions are omitted they are assumed to be the entire extent of the page.

The Add Local Template Definitions (message #401) command defines a local template which gives the length and offset of fields within an area. It is used for extracting fields from an area of a page. The parse method denotes how the data is to be extracted from the string and the presentation method indicates how it is to be transmitted. A local template is preferably given a negative number to distinguish from the templates employed in connection with MARKETSTREAM by way of example.
The format is:

```
<FS>401(<US><Application_specific_field>)
   <GS><Local_template_ID>
   1{ <RS><Local_field_ID><US><Length><US><Byte_offset>
      (<US>Parse_Method<US><Presentation_Method>) }m
<FS>
```

The Drop Local ID (message #402) command will delete a local ID.
The format is:

```
<FS>402(<US><Application_specific_field>)
   <GS><Local_RIC>
<FS>
```

The Drop Local Template (message #403) command is used to delete a local template definition.
The format is:

```
<FS>403(<US><Application_specific_field>)
   <GS><Local_template_ID>
<FS>
```

The Drop All Local IDs (message #404) command is used to delete all local IDs.
The format is:

```
<FS>404(<US><Application_specific_field>)
<FS>
```

The Drop All Local Templates (message #405) command is used to delete all local templates.
The format is:

```
<FS>405(<US><Application_specific_field>)
<FS>
```

An exemplary program listing for achieving the various functions of the host computer described above in accordance with the presently preferred method of the present invention is annexed hereto as Tables A-G which may be run on an IBM PC and is in the format of PL/M-86 compiler written in C code such as available from Lattice Inc.

TABLE A

PL/M-86 COMPILER     MFP - MarketFeed Processor Code Fragments
Filter Set Maintenance: Add, Drop, Drop All

```
/*
 *    Title - AddSFSI, DropSFSI, DropSAllSFSI
 *
 *    Function/Operation -
 *       This set of procedures maintain the Filter Set
 *    data structure (FILTERS). They allow filters to be
 *    added or removed, and they allow the entire set of
 *    filters to be deleted.
 *
 *    No checks are made to interlock the deletion of filters
 *    and possible use of the filter by entries posted to the
 *    UFL.
 *
 *    Calling Sequences:
 *
 *    call AddSFSI( MSGSp );
 *    call DropSFSI( MSGSp );
 *    call DropSAllSFSI( MSGSp );
 *
 */

233  1    AddSFSI:
          Procedure (MSGSp) Reentrant;

234  2    declare
              MSGSp                pointer,
              (MSG based MSGSp)    MSGSStructure;

235  2    declare
              i        word,
              FSISx    word;

236  2    if (MSG.FSI = 0)
237  2    then do;

/* Filter set id 0 is special, and reserved.
               */
238  3        MSG.Sts = SSNAKSTechnical;
239  3        MSG.ERRF = MFFSFSI;
240  3        end;
241  2    else do;
242  3        if (FindSFSI( MSGSp) <> MAXSFSI)
243  3        then do;
244  4            MSG.Sts = SSNAKSTechnical;
245  4            MSG.ERRF = MFFSFSI;
246  4            end;
247  3        else do;

/* Not already in the FILTERS definitions: Add it in
                   */
248  4            if ((FSISx := GetSFSISSlot) = MAXSFSI)
249  4            then MSG.Sts = SSXSSFSI;
250  4            else do;
251  5                MSG.Sts = SSACK;    /* Assume that it will work.   */
252  5                FILTERS(FSISx).FSI = MSG.FSI;
253  5                i = 0;
254  5                do while ((MSG.FID(i) <> 0) AND (i < MAXSFIDSFSI));
255  6                    FILTERS(FSISx).FIDS(i) = MSG.FID(i);
256  6                    if (MSG.FID(i) = 1) then do;

/* Attempt to reference the permission fid.
                               */
258  7                        MSG.Sts = SSNotSPermissioned;
259  7                        MSG.ERRF = MFFSFID;
260  7                        end;
261  6                    i = i + 1;
262  6                    end;
263  5                FILTERS(FSISx).NumberSofSFields = i;
264  5                if (i = 0) then do;
266  6                    MSG.Sts = SSNAKSTechnical;
267  6                    MSG.ERRF = MFFSFID;
268  6                    end;
```

```
269  5                            if (MSG.Sts <> SSACK) then FILTERS(FSISx).FSI = 0;
271  5                        end;
272  4                    end;
273  3                end;
274  2            MSG.NO = MSStsSResponse;
275  2            call PutSMFSMsg( MSGSp );
276  2            end AddSFSI;

/********/
277  1       DropSFSI:
             /********/
                 Procedure (MSGSp) Reentrant;

278  2           declare
                     MSGSp                 pointer,
                     (MSG based MSGSp)     MSGSStructure;

279  2           declare
                     FSISx                 word;

280  2           if (((FSISx := FindSFSI( MSGSp )) = MAXSFSI)
                         OR
                     (MSG.FSI = 0))
281  2           then do;

/* Can't kill it if it doesn't exist.
                     */
282  3               MSG.Sts = SSNoSFSI;
283  3               MSG.ERRF = MFFSFSI;
284  3               end;
285  2           else do;

/* Make the slot reusable.
                     */
286  3               FILTERS(FSISx).FSI = 0;
287  3               MSG.Sts = SSACK;
288  3               end;
289  2           MSG.NO = MSStsSResponse;
290  2           call PutSMFSMsg( MSGSp );
291  2           end DropSFSI;

/********/
292  1       DropSAllSFSI:
             /********/
                 Procedure (MSGSp) Reentrant;

293  2           declare
                     MSGSp                 pointer,
                     (MSG based MSGSp)     MSGSStructure;

294  2           declare
                     FSISx                 word;

/* Make all slots reusable
                 */
295  2           do FSISx = 0 to (MAXSFSI-1);
296  3               FILTERS(FSISx).FSI = 0;
297  3               end;

298  2           MSG.Sts = SSACK;
299  2           MSG.NO = MSStsSResponse;
300  2           call PutSMFSMsg( MSGSp );
301  2           end DropSAllSFSI;

$subtitle('Local RIC Maintenance: Add, Drop, Drop All')
             /*
              *    Title - AddSLRIC, DropSLRIC, DropSAllSLRIC
              *
              *    Function/Operation -
              *        This set of procedures maintain the Local RIC
              *    data structure (LPNT). They allow RICs (or tags) to be
              *    added or removed, and they allow the entire set of
              *    Local Page Names (LRICs) to be deleted.
              *
              *    No checks are made to interlock the deletion of RICs
              *    and possible use of the RIC by entries posted to the
              *    UFL.
              *
```

```
         *    Calling Sequences:
         *
         *    call AddSLRIC( MSGSp);
         *    call DropSLRIC( MSGSp);
         *    call DropSAllSLRIC( MSGSp);
         *
         */

302  1   AddSLRIC:
         Procedure (MSGSp) Reentrant;

303  2   declare
             MSGSp                  pointer,
             (MSG based MSGSp)      MSGSStructure;

304  2   declare
             i                      word,
             LRICSx                 word;

/*
          * Validate that all needed parameters are reasonably specified.
          */
305  2   if ((MSG.LRIC(0) = 0) OR
             (MSG.RIC(0) = 0) OR
             (MSG.BR = 0) OR
             (MSG.BC = 0) OR
             (MSG.ER = 0) OR
             (MSG.EC = 0) OR
             (MSG.TNO = 0))
306  2   then MSG.Sts = SSNAKSTechnical;
307  2   else do;

/* Looks reasonable: Is it already defined?
              */
308  3       if (FindSLRIC( MSGSp) <> MAXSLRIC)
309  3       then do;
310  4           MSG.Sts = SSNAKSTechnical;
311  4           MSG.ERRF = MFFSRIC;
312  4           end;
313  3       else do;
314  4           if ((LRICSx := GetSLRICSSlot) = MAXSLRIC)
315  4           then MSG.Sts = SSXSSLRICs;
316  4           else do;

/* Further qualify the row/column extents
                      */
317  5               if ((24 < MSG.BR) OR
                         (MSG.BR <> MSG.ER) OR
                         (30 < MSG.BC) OR
                         (80 < MSG.EC) OR
                         (MSG.EC < MSG.BC))
318  5               then MSG.Sts = SSNAKSTechnical;
319  5               else do;

/* All tests passed, transfer in the data.
                          */
320  6                   do i = 0 to (MAXSISRICSLen-1);
321  7                       LPNT(LRICSx).LRIC(i) = MSG.LRIC(i);
322  7                       LPNT(LRICSx).RIC(i)  = MSG.RIC(i);
323  7                       end;
324  6                   LPNT(LRICSx).BR = MSG.BR;
325  6                   LPNT(LRICSx).ER = MSG.ER;
326  6                   LPNT(LRICSx).BC = MSG.BC;
327  6                   LPNT(LRICSx).EC = MSG.EC;
328  6                   LPNT(LRICSx).Template = MSG.TNO;
329  6                   MSG.Sts = SSACK;
330  6                   end;
331  5               end;
332  4           end;
333  3       end;
334  2   MSG.NO = MSStsSResponse;
335  2   call PutSMFSMsg( MSGSp);
336  2   end AddSLRIC;

/********/
337  1   DropSLRIC:
         /********/
         Procedure (MSGSp) Reentrant;
```

```
338   2       declare
                  MSGSp                 pointer,
                  (MSG based MSGSp)     MSGSStructure;

339   2       declare
                  LRICSx                word;

340   2       if ((LRICSx := FindSLRIC( MSGSp)) = MAXSLRIC)
341   2       then do;
342   3           MSG.Sts = SSNAKSName;
343   3           MSG.ERRF = MFFSLRIC;
344   3           end;
345   2       else do;
346   3           LPNT(LRICSx).LRIC(0) = 0;
347   3           MSG.Sts = SSACK;
348   3           end;
349   2       MSG.NO = MSStsSResponse;
350   2       call PutSMFSMsg( MSGSp);
351   2       end DropSLRIC;

/********/
352   1   DropSAllSLRIC:
              /********/
              Procedure (MSGSp) Reentrant;

353   2       declare
                  MSGSp                 pointer,
                  (MSG based MSGSp)     MSGSStructure;

354   2       declare
                  LRICSx                word;

355   2       do LRICSx = 0 to (MAXSLRIC-1);
356   3           LPNT(LRICSx).LRIC(0) = 0;
357   3           end;

358   2       MSG.Sts = SSACK;
359   2       MSG.NO = MSStsSResponse;
360   2       call PutSMFSMsg( MSGSp);
361   2       end DropSAllSLRIC;

$subtitle('Local Template Maintenance: Add, Drop, Drop All')
```

TABLE C

```
PL/M-86 COMPILER    MFP - MarketFeed Processor Code Fragments
                    Local Template Maintenance: Add, Drop, Drop All /*
          *   Title - AddSLTMP, DropSLTMP, DropSAllSLTMP
          *
          *   Function/Operation -
          *      This set of procedures maintain the Local RIC
          *      data structure (LTMP). They allow Templates to be
          *      added or removed, and they allow the entire set of
          *      Local Templates to be deleted.
          *
          *      No checks are made to interlock the deletion of Local
          *      Templates and possible use of the template by entries
          *      posted to the uPL.
          *
          *   Calling Sequences:
          *
          *      call AddSLTMP( MSGSp);
          *      call DropSLTMP( MSGSp);
          *      call DropSAllSLTMP( MSGSp);
          *
          */

362   1   AddSLTMP:
              Procedure (MSGSp) Reentrant;

363   2       declare
                  MSGSp                 pointer,
                  (MSG based MSGSp)     MSGSStructure;

364   2       declare
                  i                     word,
                  LTMPSx                word;
```

```
                    /*
                     * Validate that all needed parameters are reasonably specifi
                     */
365   2             if ((MSG.TNO = 0) OR
                        (MAXSTemplates <= MSG.TNO))
366   2             then MSG.Sts = SSNAKSTechnical;
367   2             else do;

/* Check that the template is not already in use.
                         */
368   3                if (FindSLTMP( MSGSp) <> MAXSTemplates)
369   3                then do;
370   4                    MSG.Sts = SSNAKSTechnical;    /* already defined   *
371   4                    MSG.ERRF = MFFSTNO;
372   4                    end;
373   3                else do;

/* Not already defined. Fill in the data
                             */
374   4                    if ((LTMPSx := GetSLTMPSSlot) = MAXSTemplates)
375   4                    then MSG.Sts = SSXSSTmp;
376   4                    else do;
377   5                        LTMP(LTMPSx).reclen = 0;
378   5                        LTMP(LTMPSx).class  = MSG.TNO;
379   5                        MSG.Sts = SSACK;           /* Could be overidden in loop */
380   5                        i = 0;
381   5                        LTMP(LTMPSx).templen = 0;  /* Highest field number   */
382   5                        do while ((MSG.Flen(i) <> 0) AND
                                        (MSG.Fid(i) < MAXSFIDSLTMP));
383   6                            fids_ptr = @LTMP(LTMPSx).FIDS(6*(MSG.Fid(i)-1));
384   6                            fid_data.ripfid = 0;
385   6                            fid_data.tef = TEF_LEN_OFFSET;
386   6                            fid_data.dif = DIF_BASIC_CHAR;
387   6                            fid_data.length = MSG.Flen(i);
388   6                            fid_data.offset = MSG.Foff(i);
389   6                            if (LTMP(LTMPSx).reclen < fid_data.length + fid_data.offset)
390   6                            then LTMP(LTMPSx).reclen = fid_data.length + fid_data.offset;
391   6                            if  (LTMP(LTMPSx).templen < MSG.Fid(i))
392   6                            then LTMP(LTMPSx).templen = MSG.Fid(i);
393   6                            i = i + 1;
394   6                            end;
395   5                        if (LTMP(LTMPSx).templen = 0)
396   5                        then do;       /* no fields defined ! */
397   6                            MSG.Sts  = SSNAKSTechnical;
398   6                            MSG.ERRF = MFFSFLEN;
399   6                            LTMP(LTMPSx).class = 0;
400   6                            end;
401   5                        end;
402   4                    end;
403   3                end;
404   2             MSG.NO = MSStsSResponse;
405   2             call PutSMPSMsg( MSGSp);
406   2             end AddSLTMP;

/*********/
407   1 DropSLTMP:
        /*********/
        Procedure (MSGSp) Reentrant;

408   2     declare
                MSGSp                   pointer,
                (MSG based MSGSp)       MSGSStructure;

409   2     declare
                LTMPSx                  word;

410   2     if ((MSG.TNO = 0) OR
                (MAXSTemplates <= MSG.TNO))
411   2     then MSG.Sts = SSNAKSTechnical;
412   2     else do;
413   3         if ((LTMPSx := FindSLTMP( MSGSp)) = MAXSTemplates)
414   3         then do;

/* Not defined, can't delete.
                     */
415   4             MSG.Sts = SSNAKSTechnical;
416   4             MSG.ERRF = MFFSTNO;
417   4             end;
418   3         else do;

/* Set "key" field to indicate unused.
                     */
419   4             LTMP(LTMPSx).class = 0;
```

```
420   4                       MSG.Sts = SSACK;
421   4                       end;
422   3                   end;
423   2               MSG.NO = MSStsSResponse;
424   2               call PutSMFSMsg( MSGSp );
425   2               end DropSLTMP;

/********/
426   1   DropSAllSLTMP:
      /********/
              Procedure (MSGSp) Reentrant;

427   2       declare
                  MSGSp              pointer,
                  (MSG based MSGSp)  MSGSStructure;

428   2       declare
                  LTMPSx             word;

429   2       do LTMPSx = 0 to (MAXSTemplates-1);
430   3           LTMP(LTMPSx).class = 0;
431   3           end;

432   2       MSG.Sts = SSACK;
433   2       MSG.NO = MSStsSResponse;
434   2       call PutSMFSMsg( MSGSp );
435   2       end DropSAllSLTMP;

$subtitle('Data and Update Request')
```

TABLE D

PL/M-86 COMPILER    MFP - MarketFeed Processor Code Fragments
                    Data and Update Request

```
      /*
       *   Title - DataUpSReq
       *
       *   Function/Operation -
       *       This procedure causes a full data snapshot to be
       *   sent to the PC, followed by automatic forwarding of data updates.
       *   If the request is invalid because the filter is not defined, or
       *   because there is not a UFL slot available, a specific error
       *   status response will be issued. Otherwise, the general technical
       *   NAK will be issued.
       *
       *   Calling Sequence:
       *
       *   call DataUpSReq( MSGSp );
       *
       */

436   1   DataUpSReq:
              Procedure (MSGSp) Reentrant;

437   2       declare
                  MSGSp              pointer,
                  (MSG based MSGSp)  MSGSStructure;

438   2       declare
                  pni                word,
                  Sts                word,
                  trigger            Structure(
                      code           byte,
                      UFLSx          word,
                      rsrvd(3)       byte),
                  nodeSp             pointer,
                  (node based nodeSp) NODE_STRUCT,
                  (i,j)              byte,
                  UFLSx              word;

/*
               * Special processing if the "Page" request is for
               * News headlines. If so, the RIC of the request is in the form:
               * XN[dN, GN, SN, etc]
               */
439   2       if ((MSG.Ric(0) = 'X')
                      AND
                  (MSG.Ric(1) = 'N')
                      AND
```

```
440  2              ('a' < MSG.Ric(2))) then do;
441  3              do i = 0 to LAST(MFSNews);
442  4                  if (CMPB( &newsScatStable(i).name, &MSG.Ric(2), 4) = 0FFFFh)
443  4                      then do;
444  5                          MFSNews(i).c_bits = newsScatStable(i).c_bits;
445  5                          do j = 0 to MAXSASFSLen-1;
446  6                              MFSNews(i).ASF(j) = MSG.ASF(j);
447  6                          end;
448  5                          MFSNews(i).fsi = MSG.FSI;
449  5                          i = LAST(MFSNews);
450  5                      end;
451  4              end;

452  3              MSG.Sts = SSWait;
453  3              MSG.NO = MSStsSResponse;
454  3              call PutSMFSMsg( MSGSp);
455  3              return;
456  3          end;

/*
                 * Validate the normal page request.
                 */
457  2          if (FindSFSI( MSGSp) = MAXSFSI)
458  2          then do;        /* Filter Set not defined   */
459  3              MSG.Sts = SSNOSFSI;
460  3              MSG.ERRF = MFFSFSI;
461  3          end;
462  2          else do;
463  3              if (FindSUFL( MSGSp) <> MAXSUFL)
464  3              then do;
465  4                  MSG.Sts = SSNAKSTechnical;     /* Already in UFL   */
466  4                  MSG.ERRF = MFFSRIC;
467  4              end;
468  3              else do;
469  4                  if ((UFLSx := GetSUFLSSlot) = MAXSUFL)
470  4                  then MSG.Sts = SSXSSLRICs;     /* No Space */
471  4                  else do;

/* Everything is legit. Make it real.
                         */
472  5                  call LockUFL( EXCLUSIVE, MFP_LOCK);
473  5                  call AddToSUFL( MSGSp, UFLSx);
474  5                  UFL(UFLSx).Status = UFL(UFLSx).Status OR
                            (sendSpage + sendSupdates);
475  5                  call UNLockUFL( EXCLUSIVE, MFP_LOCK);
476  5                  if ((pni := UFL(UFLSx).PageSNameSIndex) = 0FFFFh)
477  5                  then do;

/* Was not in PNT or TBC ???
                             */
478  6                      MSG.Sts = SSNAKSTechnical;
479  6                      MSG.ERRF = MFFSRIC;
480  6                  end;
481  5                  else do;
                            /* Set the display_map bit to reserve page
                             */
482  6                      Display_map(pni) = Display_map(pni) OR MarketFeed_Updates;
483  6                      if ((UFL(UFLSx).status AND notSyetScached) <> 0)
484  6                      then MSG.Sts = SSWait;
485  6                      else do;

/* Trigger cacheSupdate via MTOS send (with UFLSx)
                                 */
486  7                          trigger.code = 1;
487  7                          trigger.UFLSx = UFLSx;
488  7                          call SEND( CONTINUE, PRI, PGS_PRI, PGS_MBX,
                                    &trigger, &Sts));

/* At this precise instant (usually), MSUFSPR
                                 * will start processing the request just sent.
                                 */
489  7                          if (svcok(Sts)) then return; /* Important! bypass sts resp
491  7                          MSG.Sts = SSSYSSFailure;
492  7                      end;
493  6                  end;
494  5              end;
495  4          end;
496  3      end;
497  2      MSG.NO = MSStsSResponse;
498  2      call PutSMFSMsg( MSGSp);
499  2  end DataUpSReq;
       $subtitle('MSUFSUF - Update Filtering')
```

TABLE E

PL/M-86 COMPILER    MFP - MarketFeed Processor Code Fragments
                    MSUFSUF - Update Filtering

```
/*
 *  Title - MSUFSUF
 *
 *  Function/Operation -
 *      This procedure examines the updates in the NICE_BUFFER
 *  as they are being applied to the cache. If the update falls
 *  within the range of one of the MarketFeed filtered fields, the
 *  corresponding UFL entry will be marked as updated.
 *
 *      MSUFSUF's only action is to DETECT updates. MarketStream
 *  fields which may cover several MarketFeed fields (or vice-versa)
 *  are automatically converted into MarketFeed field updates, only.
 *  After all update detection is completed, cache_update calls
 *  MSUFSOT to perform any required data transmissions.
 *
 *  Calling Sequence:
 *
 *  call MSUFSUF( nbSp, dSp );
 *
 *  where:
 *      nbSp is the pointer to the NICE_BUFFER containing
 *          the MarketStream update message.
 *      dSp is the pointer to the currently active MKS description
 *          buffer. (Accurately describing the field being updated.)
 *
 *  NOTE: MSUFSUF is called only by CACHE_UPDATE. CACHE takes care
 *      to insure that the UFL lock is properly applied.
 */
```

```
500  1      MSUFSUF:
                Procedure (nbSp, dSp) public Reentrant;

501  2          declare
                    nbSp                pointer,
                    (nb based nbSp)     NICE_BUFFER, dSp                 pointer,
                    (desc based dSp)    MKS_DESC_STRUCT;

502  2          declare
                    off                 word,
                    len                 byte,
                    delta               word, fieldSx             byte,
                    nodeSp              pointer,
                    (node based nodeSp) NODE_STRUCT,
                    UFLSx               word;

/* Calculate the Offset as absolute.
                 * (take out the cache partitioning.)
                 */
503  2          len = desc.update_length;
504  2          off = desc.update_offset +
                      desc.fid_offset +
                      960*(get_relative_slot_num(desc.cache_number) - 1);

/* Every UFL entry on this link references the current
                 * MarketStream message. Check to see if the update applies
                 * to a field being monitored in the name of MarketFeed.
                 */
505  2          nodeSp = nb.node_ptr;
506  2          UFLSx = UFLSpnx(node.name_index);
507  2          do while (UFLSx <> OFFh);

/* Complete the UFL if not done yet.
                     */
508  3              if ((UFL(UFLSx).status AND UFLSpartial) <> 0)
509  3              then call setSUFL( UFLSx, nodeSp );

/* If this is an update to the permissions fid, recheck permissions
                     */
510  3              else if (desc.fid = PERMISSIONS_FID) then
511  3                  UFL(UFLSx).status = UFL(UFLSx).status OR recheckSperms;

/* If updates are to be forwarded, consider this entry.
                     */
```

```
512  3            if ((UFL(UFLSx).status AND sendSupdates) <> 0)
513  3            then do;

/* Special handling for filter set 0.
                      */
514  4                if (UFL(UFLSx).FilterSSet = MAGICSALLSFIDSFSI)
515  4                then do;
516  5                    UPSFRAGS(UPSFRAGSCOUNT).fieldSno = desc.fid;
517  5                    UPSFRAGS(UPSFRAGSCOUNT).offset   = off;
518  5                    UPSFRAGS(UPSFRAGSCOUNT).length   = len;
519  5                    UPSFRAGS(UPSFRAGSCOUNT).foff     = desc.update_offset;
520  5                    UPSFRAGSCOUNT = UPSFRAGSCOUNT + 1;
521  5                    UFL(UFLSx).status = UFL(UFLSx).status OR UFLSupdated;
522  5                end;
523  4                else do;

/* Look at all of the fields described by this UFL
                          */
524  5                    fieldSx = 0;
525  5                    FieldsSptr = @UFL(UFLSx).fieldSset;
526  5                    do while ((fieldSx < UFL(UFLSx).ValidSFields) AND
                                     (Fields.Offset <= off+len));

527  6                        if (((off <= Fields.Offset) AND (Fields.Offset < off + len))
                                  OR
528  6                            ((Fields.Offset < off) AND (off < Fields.Offset+Fields.Length)))
                              then do;

/* If the update is within the monitored field
                                   * remember this for later.
                                   */
529  7                            UPSFRAGS(UPSFRAGSCOUNT).fieldSno = desc.fid;
530  7                            UPSFRAGS(UPSFRAGSCOUNT).offset   = off;
531  7                            UPSFRAGS(UPSFRAGSCOUNT).length   = len;
532  7                            delta = off - Fields.Offset;
533  7                            if (off < Fields.Offset) then do;
535  8                                delta = Fields.Offset - off;
536  8                                UPSFRAGS(UPSFRAGSCOUNT).length = len - delta;
537  8                                UPSFRAGS(UPSFRAGSCOUNT).offset = off + delta;
538  8                                UPSFRAGS(UPSFRAGSCOUNT).foff   = 0;
539  8                            end;
540  7                            else UPSFRAGS(UPSFRAGSCOUNT).foff = delta;

541  7                            if (Fields.length <
                                         (UPSFRAGS(UPSFRAGSCOUNT).foff +
                                          UPSFRAGS(UPSFRAGSCOUNT).length)) then
542  7                                UPSFRAGS(UPSFRAGSCOUNT).length = Fields.Length
                                                                    - UPSFRAGS(UPSFRAGSCOUNT).foff;
543  7                            UPSFRAGSCOUNT = UPSFRAGSCOUNT + 1;
544  7                            UFL(UFLSx).status = UFL(UFLSx).status OR UFLSupdated;
545  7                        end;
546  6                        fieldSx = fieldSx + 1;
547  6                        FieldsSptr = @UFL(UFLSx).fieldSset(S+fieldSx);
548  6                    end;
549  5                end;
550  4            end;
551  3            UFLSx = UFL(UFLSx).Link;
552  3        end;
553  2    end MSUFSUF;
```

$subtitle('Add entry to Update Forwarding List')

TABLE F

PL/M-86 COMPILER.    MFP - MarketFeed Processor Code Fragments
                     Add entry to Update Forwarding List

```
/*
 *   Title - AddStoSUFl
 *
 *   Function/Operation -
 *       This procedure adds an entry to the UFL list by
 *   filling in some of the basic fields. The insertion of data into
 *   some of the fields, however is not performed until
 *   MSUF gains access to the UFL. This is done to centralize
 *   the operation of accessing template related data in the case
 *   of a standard page that is not yet cached (and therefore, the
 *   template to use is unknown.)
 *
 *   Calling Sequence:
 *
 *   call AddStoSUFL( MSGSb, UFLSx)
 *
```

```
                *       Where MSGSp is the address of the Message Structure that
                *               contains the data to be inserted, and
                *           UFLSx is the index to the UPL array of the entry
                *               to which the data will be added.
                *
                *   NOTE: If the RIC (possibly as translated through the Local
                *         Page Name Table) cannot be located in either the
                *         PNT or TBC, then UPL().pageSnameSindex is returned
                *         with OFFFFh.
                *
                */

554   1     AddStoSUFL:
              Procedure (MSGSp, UFLSx) Reentrant;

555   2       declare
                  MSGSp                 pointer,
                  (MSG based MSGSp)     MSGSStructure, UFLSx                 word;

556   2       declare
                  nodeSp                pointer,
                  (PNTSnode based nodeSp) NODE_STRUCT,
                  UFLSn                 word,
                  i                     word;

/* Do the easy setups: transfer in some fields.
               */
557   2       UPL(UFLSx).status = (UFLSinSuse + UFLSpartial);
558   2       UPL(UFLSx).FilterSSet = MSG.FSI;
559   2       call MCVB( aMSG.RIC, aUPL(UFLSx).RIC, MAXSISRICSLen);
560   2       call MCVB( aMSG.ASF, aUPL(UFLSx).ASF, MAXSISRICSLen);

/* Look for the page. There is a slight difference
               * If the page is not yet in cache.
               */
561   2       nodeSp = MFSmember( MSGSp, PNT);
562   2       if (nodeSp = NIL) then do;
564   3           nodeSp = MFSmember( MSGSp, TBC);
565   3           UPL(UFLSx).status = UPL(UFLSx).status OR notSyetScached;
566   3       end;
567   2       if (nodeSp = NIL)
568   2       then UPL(UFLSx).PageSNameSIndex = OFFFFh;
569   2       else do;
570   3           UPL(UFLSx).PageSNameSIndex = PNTSnode.name_index;
                  /*
                   * Add to the end of the page's UPL list.
                   * (Special treatment if the list is currently empty.)
                   */
571   3           UPL(UFLSx).Link = CFFh;
572   3           if ((UFLSn := UFLSpnx( PNTSnode.name_index)) = OFFh)
573   3           then UFLSpnx(PNTSnode.name_index) = UFLSx;
574   3           else do;
575   4               do while (UPL(UFLSn).Link <> OFFh);
576   5                   UFLSn = UPL(UFLSn).Link;
577   5               end;
578   4               UPL(UFLSn).Link = UFLSx;
579   4           end;
580   3       end;
581   2     end AddStoSUFL;

Ssubtitle('Fill in remainder of the UFL')
          /*
           *    Title - setSUFL
           *
           *    Function/Operation -
           *        This procedure is used to fill in the portions of the UPL
           *    that MFP could not complete. These fields are Class, Template
           *    and all Fields data. MFP cannot supply this data for the case
           *    where the desired page is not currently cached. In this case,
           *    the template governing the page is not known, and the translation
           *    of the filter set to field offset/length values cannot be done.
           *
           *    Calling Sequence:
           *
           *    call setSUFL( UFLSx, nodeSp);
           *
           *    where: UFLSx is the index of the UPL entry being completed, and
           *           nodeSp is the address of the node indicating where
           *                  in cache the page data (and template number) is
           *                  located.
           *
```

```
582  1    setSUPL:
          Procedure (UPLSx, nodeSp) reentrant;

583  2    declare
              UPLSx                     word,
              nodeSp                    pointer,
              (node based nodeSp)       NODE_STRUCT;

584  2    declare
              FSISx                     word,
              LRICSx                    word,
              LTMPSx                    word,
              low                       word,
              high                      word,
              inc                       word,
              bias                      word, cacheSp                   pointer,
              (cache based cacheSp)     CACHE_STRUCT,
              templateSp                pointer,
              (template based templateSp) TEMPLATE_STRUCT,
              fidsSp                    pointer,
              (fids based fidsSp)       FIDS_STRUCT;

585  2    declare
              offset_to_data            Literally '36';

586  2    cacheSp = start_paragraph( node.cache_number);
587  2    UPL(UPLSx).status = UPL(UPLSx).status AND (NOT UPLSpartial);

/* Check permissioning
           */
588  2    if (NOT page_permissioned( PC, node.cache_number))
589  2    then do;
590  3        call ASMFSSts( UPLSx, SASNotSPermissioned);
591  3        return;        /* DO NOTHING ELSE   */
592  3        end;

/* Search the Local RIC table for a match on the RIC in the
           * UPL. If found, this means that the UPL.RIC describes
           * a locally defined page.
           */
593  2    LRICSx = 0;
594  2    do while ((LRICSx < MAXSLRIC) AND
                    (CMPB( aLPNT(LRICSx).LRIC,
                           aUPL(UPLSx).RIC,
                           MAXSISRICSLen) <> 0FFFFh)));
595  3        LRICSx = LRICSx + 1;
596  3        end;

597  2    if (LRICSx = MAXSLRIC)
598  2    then do;

/* RIC not in Local Page Name Table:
               * Use the standard template and size.
               */
599  3        UPL(UPLSx).template = cache.template;
600  3        templateSp = template_ptrs(cache.template);
601  3        UPL(UPLSx).ValidSFields = template.templen; /* if FilterSet == 0 */
602  3        low = offset_to_data;      /* start after permissions   */
603  3        high = template.reclen;
604  3        bias = 0;
605  3        end;
606  2    else do;

/* RIC in the LPNT: Use override template
               * and sizings.
               */
607  3        UPL(UPLSx).template = LPNT(LRICSx).template OR 080h;
608  3        LTMPSx = 0;
609  3        do while ((LTMPSx < MAXSTemplates) AND
                        (LTMP(LTMPSx).class <> LPNT(LRICSx).template));
610  4            LTMPSx = LTMPSx + 1;
611  4            end;
612  3        if (LTMPSx = MAXSTemplates)
              then      /* undefined template?  */
613  3            call ASMFSSts( UPLSx, SASNoTemplate);
614  3        else do;

615  4            templateSp = aLTMP(LTMPSx);
```

```
616   4            UFL(UFL$x).Valid$Fields = template.templen; /* if filter$set == 0 */

/* Calculate highest and lowest offsets
                    * based on the user's definition of the page.
                    * NOTE: This code works only when the following is true:
                    *    SR = ER, SC < EC.
                    *
                    * (All coordinates are 1-based.)
                    */
617   4            if (is24x80( node.cache_number)) then inc = 80;
619   4                                              else inc = 64;
620   4            low  = offset_to_data +
                          ((LPNT(LRIC$x).SR-1) * inc) + (LPNT(LRIC$x).SC-1);
621   4            high = offset_to_data +
                          ((LPNT(LRIC$x).ER-1) * inc) + LPNT(LRIC$x).EC;
                                                /* ===============================
                                                 * Note: the EC coordinate is
                                                 *   not adjusted (-1) because
                                                 *   we need later to increment
                                                 *   high for use in checking.
                                                 * ===============================
                                                 */
622   4            bias = low;
623   4            end;
624   3         end;

/* Find the filter set and set up the Fields portion of
               * the UFL.
               */
625   2       if (UFL(UFL$x).filter$set <> MAGIC$ALL$FIDS$FSI)
626   2       then do;

/* Look up the filter set
                  */
627   3          FSI$x = 0;
628   3          do while ((FSI$x < MAX$FSI) AND
                           (FILTERS(FSI$x).FSI <> UFL(UFL$x).filter$set));
629   4             FSI$x = FSI$x + 1;
630   4          end;
631   3          if (FSI$x = MAX$FSI)
                 then    /* Filter set NOT located. */
632   3             call ASMFSSts( UFL$x, SA$NoFilterSet);
633   3          else do;

/* Build the Fields$Set data of the UFL.
                     */
634   4             UFL(UFL$x).Valid$Fields = FILTERS(FSI$x).Number$of$Fields;
635   4             do inc = 0 to FILTERS(FSI$x).Number$of$Fields-1;
636   5                Fields$ptr = @UFL(UFL$x).Fields$Set(5*inc);
637   5                call Init$Fields$Set( Fields$ptr,
                                             FILTERS(FSI$x).FIDS(inc),
                                             template$p);
638   5                Fields.offset = Fields.offset + bias;
639   5                if ((fields.offset < low) OR
                           (bigh < fields.offset+fields.length))
                       then    /* serious error in field specification */
640   5                   call ASMFSSts( UFL$x, SA$$ad$Template);
641   5             end;

/* Sort the Fields$Set into ascending offset order
                     * This will allow MSUFSUF to terminate testing
                     * without looking at every possible field.
                     */
642   4             call wsort(@UFL(UFL$x).Fields$Set, 3, UFL(UFL$x).Valid$Fields, 1);
643   4          end;
644   3       end;
645   2    end set$UFL;

646   1  end MFP;
```

Summarizing the presently preferred method of the present invention, when the transmitted trading instrument data record is in a page display format, a local receiver template is defined at the receiving end in order to convert the page display format to a logical data format. In defining the local receiver template, data locations in a portion of the page display format are defined for defining relative positions of logical fields in the page display format for a given display row in the page display format for providing a local template defined set of displayable information record fields. Each of the defined data locations comprises a defined area of the page display format display row. Each of the defined areas comprises an individual displayable information record field in the received transmitted displayable page data record with the displayable page data record comprising a plurality of bytes. In such an instance, each field is defined by an offset from the beginning of the associated area and the number of bytes comprising the field.

In either instance, that is whether the transmitted record is originally in a logical data format or a page display format, a desired filter set of displayable information record fields is defined at the receiving end with the defined desired filter set comprising a plurality of record field identifiers. Each of the record field identifiers is uniquely associated with a different one of the displayable information record fields, with the defined filter set comprising a receiver defined portion of the plurality of available displayable information record fields. In the instance when a local receiver template is employed for data in a page display format, the desired filter set is defined in the local receiver template and is extracted from the local receiver template with the extracted filter set comprising a plurality of record field identifiers.

When the transmitted trading instrument data record is in the form of logical data, it is tagged in the received transmitted trading instrument common data stream with the desired receiver defined filter set for defining a new receiver defined local trading instrument displayable data record for each of the tagged transmitted trading instruments with the new local trading instrument displayable data record comprising only the portion of the information categories corresponding to the receiver defined portion of displayable information record fields. Thus, a new user defined local trading instrument is created which provides a display of only the information desired by the local subscriber. Moreover, this new user defined local trading instrument may be dynamically updated as the particular categories defined in this new local trading instrument are dynamically updated in the transmitted common data stream so that from the local subscriber's point of view it appears as if he is dynamically receiving his uniquely tailored local trading instruments such as stocks, bonds or other financial instruments. When the particular transmitted trading instrument data record is in a page display format, this record is tagged in the common data stream with the associated local receiver template for defining a new receiver defined local trading instrument displayable data record for each of the tagged transmitted trading instrument displayable page data records, with the extracted filter set displayable information record fields defining the new receiver defined local trading instrument displayable data record which comprises a reconstituted data record different from the transmitted trading instrument displayable page data record. This is also true for data in the logical data format wherein the extracted filter set displayable information fields comprise a reconstituted data record for each of the created new local trading instrument displayable data records which reconstituted data record is different from the transmitted trading instrument data record.

By employing the method and system of the present invention an efficient system for dynamically creating receiver definable or locally identifiable dynamically updateable local trading instrument displayable data records at the receiver end or local subscriber so that only the information desired by the local subscriber is displayed on his screen as user defined local trading instruments is achieved.

What is claimed is:

1. A method for dynamically creating a receiver definable local trading instrument displayable record from a remotely transmitted trading instrument common data stream for a plurality of trading instruments, said transmitted trading instrument common data stream comprising a plurality of transmitted trading instrument data records, each of said trading instrument data records comprising a plurality of different displayable information record fields, each of said displayable information record fields for a particular trading instrument data record comprising an information category for said particular trading instrument data record, said common data stream being remotely transmitted to a receiving end; said method comprising the steps of:

defining a desired filter set of displayable information record fields at said receiving end, said defined desired filter set comprising a plurality of record field identifiers, each record field identifier being uniquely associated with a different one of said different displayable information record fields in said transmitted trading instrument common data stream, said defined filter set comprising a receiver defined portion of said different displayable information record fields;

tagging at least one transmitted trading instrument displayable data record in said received transmitted trading instrument common data stream with said desired receiver defined filter set to create at least one common tagged transmitted trading instrument for defining a new receiver defined local trading instrument displayable record for each of said tagged transmitted trading instruments, said new local trading instrument displayable record comprising only a portion of said information categories which correspond to said receiver defined portion of displayable information record fields; and extracting said receiver defined filter set displayable information record fields from said transmitted trading instrument common data stream for each of said tagged trading instrument data records based on said filter set defined record field identifiers for providing said receiver defined local trading instrument displayable record, said extracted receiver defined filter set displayable information fields comprising reconstituted data records for each of said created new local trading instrument displayable records, said reconstituted data records being different from said transmitted trading instrument data records; whereby unique user defined locally identifiable trading instrument displayable data records are displayed at the receiving end from a common remotely transmitted trading instrument data stream dependent on displayable information needs of the user.

2. A method in accordance with claim 1 wherein said filter set defining step comprises the step of varying said defined filter set at said receiving end for providing a different filter set comprising a different unique plurality of record field identifiers, said tagging step comprising the step of tagging said transmitted trading instrument data records with said different filter set.

3. A method in accordance with claim 2 further comprising the step of updating said receiver defined local trading instrument displayable record based on updating of said tagged transmitted trading instrument displayable data record.

4. A method in accordance with claim 1 wherein said filter set defining step comprises the step of defining a plurality of different unique filter sets at said receiving end, each of said different unique filter sets comprising a different unique plurality of record field identifiers; said tagging step comprising the step of tagging different transmitted trading instrument displayable data records in said transmitted trading instrument common data stream with different ones of said plurality of different filter sets; whereby a plurality of different locally identifiable trading instrument data records are created at the receiving end from said common received trading instrument data stream.

5. A method in accordance with claim 4 further comprising the step of updating said receiver defined local trading instrument displayable record based on updating of said tagged transmitted trading instrument displayable data record.

6. A method in accordance with claim 1 further comprising the step of updating said receiver defined local trading instrument displayable record based on updating of said tagged transmitted trading instrument displayable data record.

7. A method in accordance with claim 1 wherein said tagging step further comprises the step of tagging a plurality of different trading instrument displayable data records in said received transmitted trading instrument common data stream with a common desired receiver defined filter set for defining a plurality of said new local trading instrument displayable records for each of said common tagged transmitted trading instruments for providing a set of common displayable information categories for each of said common tagged transmitted trading instruments.

8. A method in accordance with claim 7 wherein said filter set defining step comprises the step of varying said defined filter set at said receiving end for providing a different filter set comprising a different unique plurality of record field identifiers, said tagging step comprising the step of tagging said transmitted trading instrument data records with said different filter set.

9. A method in accordance with claim 8 further comprising the step of updating said receiver defined local trading instrument displayable record based on updating of said tagged transmitted trading instrument displayable data record.

10. A method in accordance with claim 7 wherein said filter set defining step comprises the step of defining a plurality of different unique filter sets at said receiving end, each of said different unique filter sets comprising a different unique plurality of record field identifiers; said tagging step comprising the step of tagging different transmitted trading instrument displayable data records in said transmitted trading instrument common data stream with different ones of said different unique filter sets; whereby a plurality of different locally identifiable trading instrument data records are displayed at the receiving end from said received common trading instrument data stream.

11. A method in accordance with claim 10 further comprising the step of updating said receiver defined local trading instrument displayable record based on updating of said tagged transmitted trading instrument displayable data record.

12. A method in accordance with claim 7 further comprising the step of updating said receiver defined local trading instrument displayable record based on updating of said tagged transmitted trading instrument displayable data record.

13. A method in accordance with claim 7 wherein said extracting step further comprises the step of repetitively extracting said receiver defined common filter set displayable information fields for each of said common tagged transmitted trading instruments.

14. A method in accordance with claim 1 wherein said transmitted trading instrument common data stream further comprises at least one transmitted displayable page data record, said transmitted displayable page data record comprising a page display format comprising a plurality of display rows of trading instrument data, said method further comprising the steps of:

defining a local receiver template at said receiving end, said local receiver template defining step comprising the step of defining data locations in at least a portion of said page display format for defining relative positions of logical fields in said page display format for a given display row in said page display format for providing a local template defined set of displayable information record fields, each of said defined data locations comprising a defined area of said page display format display row, each of said defined areas having a beginning and comprising an individual displayable information record field in said received transmitted displayable page data record, said displayable page data record comprising a plurality of bytes, each field being defined by an offset from the beginning of the defined area and a number of bytes which comprises the field, said local receiver template defining step further comprising the step of defining a desired filter set of displayable information record fields;

extracting said desired filter set from said receiver defined local template, said extracted filter set comprising a plurality of said record field identifiers, each record field identifier in said extracted filter set being uniquely associated with a different one of said local template defined displayable information fields;

tagging at least one transmitted displayable page data record in said received transmitted trading instrument common data stream with said local receiver template for defining a new receiver defined local trading instrument displayable record for each of said tagged transmitted trading instrument displayable page data records; and extracting said local templated extracted filter set displayable information record fields from said transmitted trading instrument common data stream for each of said tagged transmitted trading instrument displayable page data records based on said extracted filter set defined record field identifiers for providing said new receiver defined local trading instrument displayable record, said new local trading instrument displayable data record comprising a reconstituted data record different from said transmitted trading instrument displayable page data record.

15. A method in accordance with claim 14 wherein said transmitted trading instrument common data stream comprises a plurality of different transmitted displayable page data records, said template defining step further comprising the step of defining a common local receiver template usable for at least a portion of said plurality of said different transmitted displayable page data records, said tagging step comprising the steps of tagging said portion of said plurality of said different transmitted displayable page data records in said received transmitted trading instrument common data stream with said common local receiver template for defining a plurality of said new receiver defined local trading instrument displayable records for each of said common tagged transmitted trading instrument displayable page data records for providing a set of common displayable information categories for each of said common tagged transmitted trading instrument displayable page data records.

16. A method in accordance with claim 15 wherein said local template extracted filter set displayable information field extracting step further comprises the step of repetitively extractng said local template extracted common filter set displayable information record fields for each of said common tagged transmitted trading instrument displayable page data records.

17. A method in accordance with claim 15 further comprising the step of updating said receiver defined local trading instrument displayable record based on updating of said tagged transmitted trading instrument displayable page data record.

18. A method in accordance with claim 14 wherein said local template defining step comprises the step of defining a common local receiver template usable for a plurality of trading instruments, said tagging step comprising the step of tagging at least a portion of said plurality of display rows in said received transmitted displayable page data record with said common local receiver template for defining a plurality of said new receiver defined local trading instrument displayable records for each of said common tagged display rows for providing a common set of displayable information categories for each of said common tagged display rows in said received transmitted trading instrument displayable page data record.

19. A method in accordance with claim 18 wherein said local template extracted filter set displayable information field extracting step further comprises the step of repetitively extracting said local template extracted common filter set displayable information record fields for each of said common tagged transmitted trading instrument displayable page data record display rows.

20. A method in accordance with claim 18 further comprising the step of updating said receiver defined local trading instrument displayable record based on updating of said tagged transmitted trading instrument displayable page data record.

21. A method in accordance with claim 14 wherein said local receiver template defining step comprises the step of varying said template defined filter set at said receiving end for providing a different filter set comprising a different unique plurality of record field identifiers.

22. A method in accordance with claim 14 wherein said transmitted trading instrument common data stream comprises a plurality of different transmitted displayable page data records, said local receiver template defining step further comprising the step of defining a plurality of different unique local receiver templates at said receiver end each defining a different unique filter set, each of said different unique filter sets comprising a different unique plurality of record field identifiers; said tagging step comprising the step of tagging different transmitted trading instrument displayable page data records in said transmitted trading instrument displayable page data records in said transmitted trading instrument common data stream with different ones of said plurality of different filter sets.

23. A method in accordance with claim 14 wherein said local receiver template defining step further comprises the step of defining a plurality of different unique local receiver templates at said receiver end each defining a different unique filter set, each of said different unique filter sets comprising a diferent unique plurality of record field identifiers; said tagging step comprising the step of tagging different display rows in said transmitted trading instrument displayable page data record with different ones of said plurality of different filter sets.

24. A method in accordance with claim 14 further comprising the step of updating said receiver defined local trading instrument displayable record based on updating of said tagged transmitted trading instrument displayable page data record.

25. A method in accordance with claim 14 wherein said tagging step further comprises the step of tagging a plurality of different trading instrument displayable data records in said received transmitted trading instrument common data stream with a common desired receiver defined filter set for defining a plurality of said new local trading instrument displayable records for each of said common tagged transmitted trading instruments for providing a set of common displayable information categories for each of said common tagged transmitted trading instruments.

26. A method in accordance with claim 25 wherein said extracting step further comprises the step of repetitively extracting said receiver defined common filter set displayable information fields for each of said common tagged transmitted trading instruments.

27. A method for dynamically creating a receiver definable local trading instrument displayable record from a remotely transmitted trading instrument common data stream, said transmitted trading instrument common data stream comprising a plurality of transmitted trading instrument displayable page data records, each of said transmitted displayable page data records comprising a page display format comprising a plurality of display rows of trading instrument data, said common data stream being remotely transmitted to a receiving end; said method comprising the steps of:

defining a local receiver template at said receiving end, said local receiver template defining step comprising the step of defining data locations in a portion of said page display format for defining relative postions of logical fields in said page display format for a given display row in said page display format for providing a local template defined set of displayable information record fields, each of said defined data locations comprising a defined area of said page display format display row, each of said defined areas having a beginning and comprising an individual displayable information record field in said received transmitted displayable page data record, said displayable page data record comprising a plurality of bytes, each field being defined by an offset from the beginning of the defined area and a number of bytes which comprises the field, said local receiver template defining step further comprising the step of defining a desired filter set of displayable information record fields;

extracting said desired filter set from said receiver defined local template, said extracted filter set comprising a plurality of said record field identifiers, each record field identifier in said extracted filter set being uniquely associated with a different one of said local template defined displayable information fields;

tagging at least one transmitted displayable page data record in said received transmitted trading instrument common data stream with said local receiver template for defining a new receiver defined local trading instrument displayable record for each of said tagged transmitted trading instrument displayable page data records; and extracting said local template extracted filter set displayable information record fields from said transmitted trading instrument common data stream for each of said tagged transmitted trading instrument displayable page data records based on said extracted filter set defined record field identifiers for providing said new receiver defined local trading instrument displayable record, said new local trading instrument displayable data record comprising a reconstituted data record different from said transmitted trading instrument displayable page data record, each of said displayable information record fields for a particular trading instrument comprising an information category for said particular trading instrument.

28. A method in accordance with claim 27 wherein said local template defining step further comprises the step of defining a common local receiver template usable for at least a portion of said plurality of said different transmitted displayable page data records, said tagging step comprising the steps of tagging said portion of said plurality of said different transmitted displayable page data records in said received transmitted trading instrument common data stream with said common local receiver template for defining a plurality of said new receiver defined local trading instrument displayable records for each of said common tagged transmitted trading instrument displayable page data records for providing a set of common displayable information categories for each of said common tagged transmitted trading instrument displayable page data records.

29. A method in accordance with claim 28 wherein said local template extracted filter set displayable information field extracting step further comprises the step of repetitively extracting said local template extracted common filter set displayable information record fields for each of said common tagged transmitted trading instrument displayable page data records.

30. A method in accordance with claim 28 further comprising the step of updating said receiver defined local trading instrument displayable record based on updating of said tagged transmitted trading instrument displayable page data record.

31. A method in accordance with claim 27 wherein said template defining step further comprises the step of defining a common local receiver template usable for a plurality of trading instruments, said tagging step comprising the step of tagging at least a portion of said plurality of display rows in at least one of said received transmitted displayable page data records in said common data stream with said common local receiver template for defining a plurality of said new receiver defined local trading instrument displayable records for each of said common tagged display rows for providing a common set of displayable information categories for each of said common tagged display rows in said one received transmitted trading instrument displayable page data record.

32. A method in accordance with claim 31 wherein said local template extracted filter set displayable information field extracting step further comprises the step of repetitively extracting said local template extracted common filter set displayable information record fields for each of said common tagged transmitted trading instrument displayable page data record display rows in said one received transmitted trading instrumment displayable page data record.

33. A method in accordance with claim 31 further comprising the step of updating said receiver defined local trading instrument displayable record based on updating of said tagged transmitted trading instrument displayable page data record.

34. A method in accordance with claim 27 wherein said local receiver template defining step further comprises the step of varying said template defined filter set at said receiving end for providing a different filter set comprising a different unique plurality of record field identifiers.

35. A method in accordance with claim 27 wherein said transmitted trading instrument common data stream comprises a plurality of different transmitted displayable page data records, said local receiver template defining step further comprising the step of defining a plurality of different unique local receiver templates at said receiver end each defining a different unique filter set, each of said different unique filter sets comprising a different unique plurality of record field identifiers, said tagging step further comprising the step of tagging different transmitted trading instrument displayable page data records in said transmitted trading instrument displayable page data records in said transmitted trading instrument common data stream with different ones of said plurality of different filter sets.

36. A method in accordance with claim 27 wherein said local receiver template defining step further comprises the step of defining a plurality of different unique local receiver templates at said receiver end each defining a different unique filter set, each of said different unique filter sets comprising a different unique plurality of record field identifiers, said tagging step comprising the step of tagging different display rows in said transmitted trading instrument displayable page data record with different ones of said plurality of different filter sets.

37. A method in accordance with claim 27 further comprising the step of updating said receiver defined local trading instrument displayable record based on updating of said tagged transmitted trading instrument displayable page data record.

* * * * *